(12) United States Patent
Avss et al.

(10) Patent No.: US 8,700,886 B2
(45) Date of Patent: Apr. 15, 2014

(54) PROCESSOR CONFIGURED FOR OPERATION WITH MULTIPLE OPERATION CODES PER INSTRUCTION

(75) Inventors: Prasad Avss, Bangalore (IN); Jacob Mathews, Bangalore (IN)

(73) Assignee: Agere Systems LLC, Allentown, PA (US)

( * ) Notice: Subject to any disclaimer, the term of this patent is extended or adjusted under 35 U.S.C. 154(b) by 1841 days.

(21) Appl. No.: 11/755,511

(22) Filed: May 30, 2007

(65) Prior Publication Data

US 2008/0301410 A1   Dec. 4, 2008

(51) Int. Cl.
   *G06F 9/30* (2006.01)
(52) U.S. Cl.
   CPC .................. *G06F 9/30145* (2013.01)
   USPC .......................................... 712/208
(58) Field of Classification Search
   USPC .......................................... 712/208
   See application file for complete search history.

(56) References Cited

U.S. PATENT DOCUMENTS

| | | | | |
|---|---|---|---|---|
| 4,774,688 A | * | 9/1988 | Kobayashi et al. | 708/207 |
| 5,101,483 A | * | 3/1992 | Tanagawa | 712/208 |
| 5,721,945 A | * | 2/1998 | Mills et al. | 712/35 |
| 5,784,639 A | * | 7/1998 | Abramson | 712/23 |
| 6,463,339 B1 | * | 10/2002 | Vasko | 700/18 |
| 6,731,559 B2 | * | 5/2004 | Kawaguchi et al. | 365/222 |
| 2006/0101297 A1 | | 5/2006 | Naik | |

OTHER PUBLICATIONS

Subramanyan, "Processors, Chapter 6, Operand Addressing and Instruction Representation", 2005, slides 1-23.*

* cited by examiner

*Primary Examiner* — Robert Fennema
*Assistant Examiner* — William B Partridge
(74) *Attorney, Agent, or Firm* — Ryan, Mason & Lewis, LLP

(57) ABSTRACT

A processor configured to operate with multiple operation codes for each of a plurality of instructions comprises memory circuitry and processing circuitry coupled to the memory circuitry. The processing circuitry is configured to decode a first operation code to produce a given one of the instructions and to decode a second operation code different than the first operation code to also produce the given instruction. Thus, the same instruction is produced for execution by the processing circuitry regardless of whether the first operation code or the second operation code is decoded. The assignment of multiple operation codes to a given instruction may occur in conjunction with the design of the processor, and dynamic selection of a particular one of those operation codes may be performed in conjunction with assembly of code for execution by the processor.

20 Claims, 4 Drawing Sheets

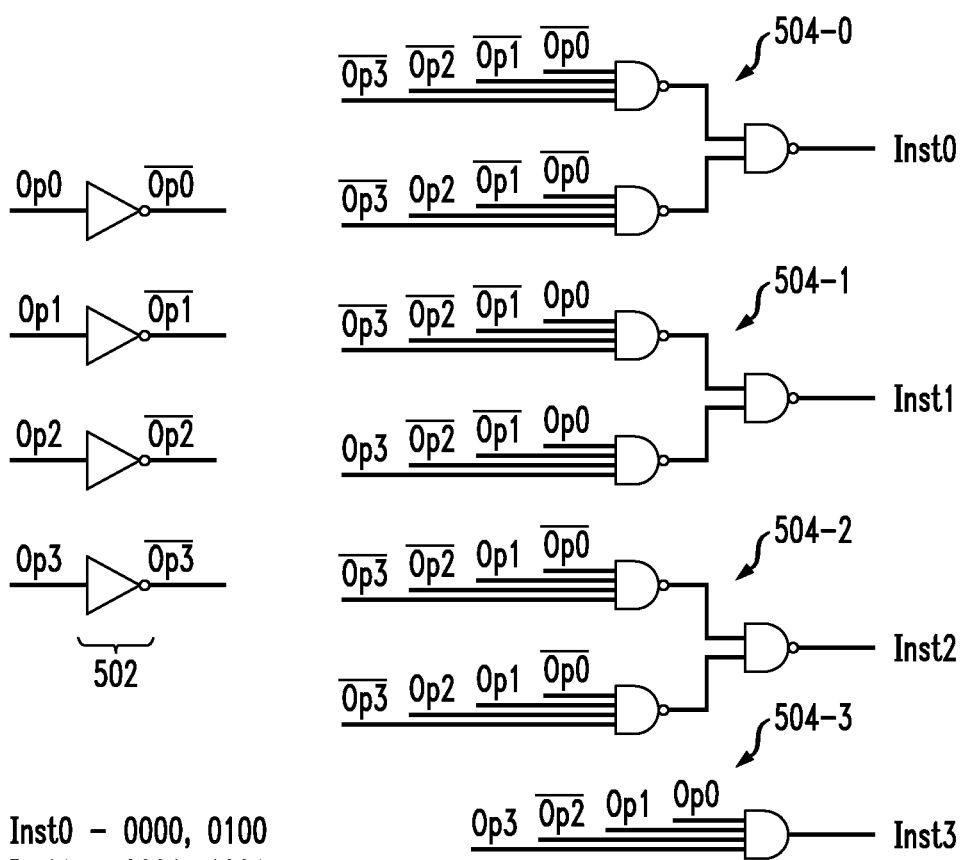

PROCESSOR CONFIGURED FOR OPERATION WITH MULTIPLE OPERATION CODES PER INSTRUCTION

FIELD OF THE INVENTION

The present invention relates generally to microprocessors and other types of digital data processors, and more particularly to the manner in which operation codes are assigned to instructions executed by such processors.

BACKGROUND OF THE INVENTION

Digital data processors execute instructions that are represented by respective operation codes, also referred to herein as "opcodes." Selection of an instruction set and assignment of opcodes to the respective instructions of that set are important issues in the design of a given processor. By way of example, a 32-bit processor that utilizes 16 bits for the opcode can support up to $2^{16}$=64K instructions. Typically, the processor will not need to support that many instructions, and thus a designer has an ability to select which of the available opcodes will be assigned to the respective instructions.

In conventional practice, a single opcode is generally assigned to each instruction. An example of this approach is described in U.S. Patent Application Publication No. 2006/0101297, entitled "Reducing Power Consumption of a Microprocessor." This approach determines the probability of occurrence of each instruction in an instruction set, and assigns an opcode to each instruction based on the probability of occurrence of that instruction in programs likely to be executed by the processor. The instructions having the highest probability of occurrence are assigned operation codes that require fewer signal transitions, such that the power consumption of the processor is reduced.

A problem with this conventional approach is that it is unduly rigid in its application, and accordingly does not achieve sufficient reduction of power consumption, particularly for processors that operate with a variety of different types of programs. More particularly, once the assignment of operation codes to respective instructions is determined, and the corresponding processor is designed and manufactured, there is insufficient opportunity to modify the initial assignment if the programs to be executed by the processor should happen to change.

Accordingly, a need exists for an improved approach to operation code assignment which provides enhanced flexibility and thereby additional opportunities for substantial reductions in processor power consumption.

SUMMARY OF THE INVENTION

The present invention meets the above-identified need in one or more illustrative embodiments by providing a processor that is capable of handling instructions that each have multiple assigned operation codes.

In accordance with one aspect of the invention, a processor configured to operate with multiple operation codes per instruction comprises memory circuitry and processing circuitry coupled to the memory circuitry. The processing circuitry is operative to retrieve operation codes from the memory circuitry and to decode the operation codes to produce corresponding instructions for execution by the processing circuitry. More particularly, the processing circuitry is configured to decode a first operation code to produce a given one of the instructions and to decode a second operation code different than the first operation code to also produce the given instruction. Thus, the same instruction is produced for execution by the processing circuitry regardless of whether the first operation code or the second operation code is decoded. Similar processing may be applied for an instruction having more than two assigned operation codes. In producing a given instruction, the processing circuitry may, for example, generate any control and select signals, or other types of signals, that are required for execution of that instruction.

Another aspect of the invention relates to a method of associating operation codes with instructions for execution in a processor. The method includes the steps of assigning the operation codes to the instructions in a manner that allows a given instruction to have multiple assigned operation codes, and selecting a particular one of the multiple assigned operation codes for use in executing a program containing the given instruction. The assigning step may be implemented in conjunction with design of the processor, and may further comprise the steps of determining frequency of occurrence of adjacent pairs of instructions in one or more programs likely to be run on the processor, and assigning the operation codes to the instructions based at least in part on the determined frequency of occurrence of the adjacent pairs of instructions. The selecting step may be implemented in conjunction with code generation for the program containing the given instruction, for example, in a code assembler.

The above-noted illustrative embodiments provide a number of significant advantages over conventional arrangements. For example, dynamic selection of the particular opcode used when executing a given instruction having multiple assigned opcodes allows the dynamic power of the processor to be substantially reduced. Also, assignment of multiple opcodes per instruction provides an opportunity to optimize the decoder logic circuitry in a way that further reduces power consumption.

BRIEF DESCRIPTION OF THE DRAWINGS

FIG. 5 is a schematic diagram showing an example of an instruction decoder in the case of assignment of multiple operation codes to each of a plurality of instructions.

DETAILED DESCRIPTION OF THE INVENTION

The invention will be illustrated below in conjunction with an exemplary implementation of a processor design and code assembly system and an associated processor. It should be understood, however, that the invention is more generally applicable to any digital data processor in which it is desirable to provide reductions in power consumption through opcode assignment and corresponding dynamic opcode selection.

The term "processor" as used herein is intended to include any device in which instructions retrieved from a memory or other storage element are executed using one or more execution units. Exemplary processors in accordance with the invention may therefore include, for example, microprocessors, digital signal processors (DSPs), microcontrollers, application-specific integrated circuits (ASICs), and computers, as well as other types of data processing devices. A given processor, or a particular portion thereof, may be implemented in the form of one or more integrated circuits.

Figure 1:
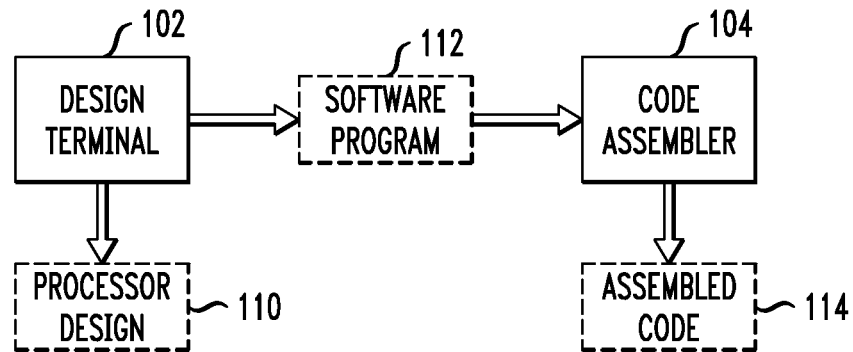
FIG. 1 is a block diagram of a system comprising components for designing a processor and assembling code for execution by that processor in accordance with an illustrative embodiment of the invention.

FIG. 1 shows a system 100 for designing a processor and assembling code for execution by that processor in an illustrative embodiment of the invention. The system 100 comprises a design terminal 102 and a code assembler 104. The design terminal may be a computer or other data processing device, such as a computer-aided design (CAD) workstation used to design processors that execute instructions. The code assembler 104 may comprise a compiler or other element or device suitable for generating assembled code from a given software program, and may be configured, for example, to run on a common computer or other data processing platform with design terminal 102. Alternatively, the code assembler may be implemented on a processing platform separate from the computer.

The design terminal 102 is used to design a processor that executes programs comprising instructions of an instruction set. An example of such a processor will be described in greater detail below in conjunction with FIGS. 3, 4 and 5. Generally, a designer interacts with a graphical user interface of the design terminal in designing the processor, using well-known techniques. The output of the design process is a processor design 110. This design will generally include a designation of an instruction set for the processor, as well as operation codes associated with the instructions of the instruction set. The design terminal in the present embodiment is also used to generate a software program 112 that includes instructions from the instruction set and is configured to cause the processor to perform certain operations. In other embodiments, the software program may be produced using a different computer or other data processing device than the design terminal 102 used to produce processor design 110. Typically the process of converting a given program to a sequence of executable instructions is performed using a compiler, although other types of code assemblers may be used.

The code assembler 104 receives the software program 112 and generates from that program a corresponding set of assembled code 114. In the assembled code, the instructions of the program are represented by opcodes, such that the instructions can be readily executed by processing circuitry of a processor defined by the processor design 110.

Figure 2:
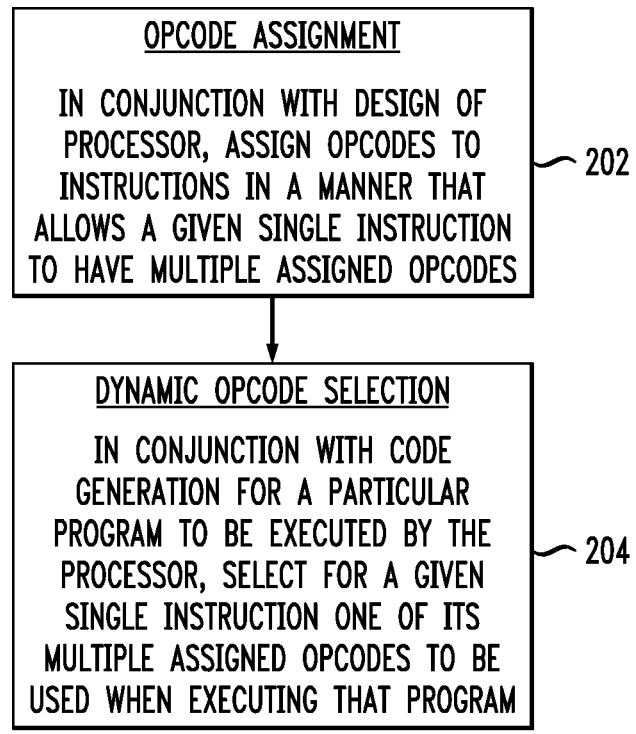
FIG. 2 is a flow diagram of a processor design and code generation process that is implemented in the system of FIG. 1.

FIG. 2 illustrates the operation of the system 100 in the illustrative embodiment. The process as shown in the flow diagram of FIG. 2 includes an opcode assignment step 202 that is implemented in the design terminal 102 of system 100, and a dynamic opcode selection step 204 that is implemented in the code assembler 104 of system 100.

In the opcode assignment step 202, opcodes are assigned to instructions, in conjunction with design of the processor, in a manner that allows a given single instruction to have multiple assigned opcodes. By way of example, in generating the processor design 110 using the design terminal 102, the processor may be designed to include processing circuitry configured to decode a first operation code to produce the given instruction and to decode a second operation code that is different than the first operation code to also produce the given instruction, such that the same instruction is produced for execution by the processing circuitry regardless of whether the first operation code or the second operation code is decoded. Processing circuitry of this type may be implemented in the form of an instruction decoder, a simplified example of which is shown in FIG. 5, or using other types of conventional processor circuitry modified in a straightforward manner to implement one or more of the techniques disclosed herein.

The dynamic opcode selection step 204 is performed in conjunction with code generation for a particular program to be executed by the processor. In this step, one of the multiple assigned opcodes for a given single instruction is selected for use when executing that program. Thus, the assembled code 114 will include the selected opcode, and that opcode will be executed when the assembled code is executed by a processor configured in accordance with the processor design 110. This selection step is repeated for other instructions of the program that may have multiple assigned opcodes. The selection of a particular opcode for a given single instruction may be based upon one or more adjacent instructions in the program, as will be described in greater detail below.

The illustrative embodiment assigns the opcodes in step 202 and dynamically selects from the assigned opcodes in step 204 in a manner which tends to reduce the power consumption of the processor. Generally, this is achieved by reducing the number of signal transitions that occur over sequences of executed instructions, as will be described in greater detail below. The power dissipated during such signal transitions is referred to herein as the dynamic power of the processor, and it is this dynamic power that may be significantly reduced using the techniques of the invention.

The opcode assignment step 202 of FIG. 2 will now be described in greater detail. In the illustrative embodiment, the opcode assignment may be implemented using the following process comprising Steps 1 through 5:

1. Identify a set of typical software programs that are likely to be run most often on the processor being designed.

2. Analyze these programs and extract frequency of occurrence of different adjacent instruction pairs.

3. The adjacent instruction pair that has the highest frequency of occurrence is determined and the opcode assignment is performed for that pair in such a way that the Hamming distance between the opcodes assigned to the respective instructions of the pair is as small as possible, where Hamming distance is defined as the number of bits that change from one opcode to the other. For example, the Hamming distance between 1100 and 0001 is three. Thus, the smallest possible Hamming distance between different opcodes will be one, also referred to herein as unit Hamming distance.

4. The adjacent instruction pair that has the next highest frequency of occurrence is then determined and the opcode assignment is attempted for that pair in the manner described in Step 3 above. It is possible that one of the instructions in this pair has already been assigned an opcode. If this is the case, do the following:

A. If it is possible to assign an opcode to the other instruction in the current pair which is at the smallest Hamming distance with respect to the instruction that has already been assigned, then assign that opcode.

B. If all the nearest opcodes are already assigned to other instructions, then determine if the current pair is distributed over all the programs or mostly occurring in conjunction with a particular pair that has already been assigned opcodes. If the current pair occurs mostly in conjunction with another pair, then use the opcode that is closest to the assigned opcode of the other pair. Otherwise, use the two best opcodes. This will lead to a situation where one instruction has multiple assigned opcodes, as described previously. Such a situation is also referred to herein as "degeneracy" of opcode assignment.

5. Repeat Step 4 until one or more opcodes have been assigned to each of the instructions under consideration.

A particular example of the above-described opcode assignment process will now be described. Let the instruction sequence be I0, I1, I2, I3, I4, I5, etc. Further assume that based on the adjacency analysis, the adjacent pairs in order of decreasing frequency of occurrence are given by (<I2,I5>, <I0,I1>, <I1,I6>, . . . ).

Since the pair <I2,I5> has the highest frequency of occurrence, this pair is assigned opcodes that are at unit Hamming distance. For example, I2 may be assigned the opcode 0000 0000 and I5 may be assigned the opcode 0000 0001.

The pair with the second highest frequency of occurrence is <I0,I1> and this pair gets the next best opcode assignment, which is also unit Hamming distance if possible. For example, I0 may be assigned the opcode 0000 0010 and I1 may be assigned the opcode 0000 0011.

The third pair <I1,I6> in the order includes instruction I1 that has already been assigned an opcode. Therefore, a determination is made as to whether or not an opcode can be assigned to I6 that is unit Hamming distance from the opcode already assigned to I1. In the present case, such an opcode can be assigned, for example, 0000 0111, and so that opcode is assigned to I6. If this were not possible, a determination would be made as to whether the <I1,I6> pair occurs mostly with the <I0,I1> pair or is more distributed. If it occurs mostly with the <I0,I1> pair then the best possible code for I6 is chosen in conjunction with the I1 code that is assigned to the pair <I0,I1>. Otherwise, all the possible combinations may be examined and two or more opcodes that result in the best Hamming distance are assigned.

It should be noted that the process described above for assignment of opcodes to instructions is presented by way of illustration only, and numerous alternative techniques may be used to assign opcodes to instructions in other embodiments.

The dynamic opcode selection step 204 of FIG. 2 will now be described in greater detail. As described above, based on the opcode assignment process, one or more instructions may each have multiple assigned opcodes. Thus, at the time of code generation for a given program, the code assembler 104 needs to determine which particular opcode should be selected for use from the multiple opcodes assigned to a given instruction. It is this selected opcode that is used in the assembled code 114 that is executed by the processor. The code assembler in making this selection may, for example, look at the opcode assigned to the previous instruction and then select the opcode for the current instruction using a criterion such as minimum Hamming distance. The previous instructions examined in this selection process may comprise loops, branches, jumps or other similar instructions.

A particular example of the above-described dynamic opcode selection process will now be described. Let the instruction sequence again be I0, I1, I2, I3, I4, I5, etc. Further assume that the code assembler 104 has information regarding any multiple assigned opcodes. For a given one of these instructions having multiple assigned opcodes, the code assembler selects a particular one of the assigned opcodes so as to minimize Hamming distance relative to the opcode assigned to the previous instruction. A multiple-pass approach may be used to optimize the Hamming distance, particularly in the presence of loops. Thus, multiple iterations of a given selection process may be used in order to arrive at an optimal selection.

Figure 3:
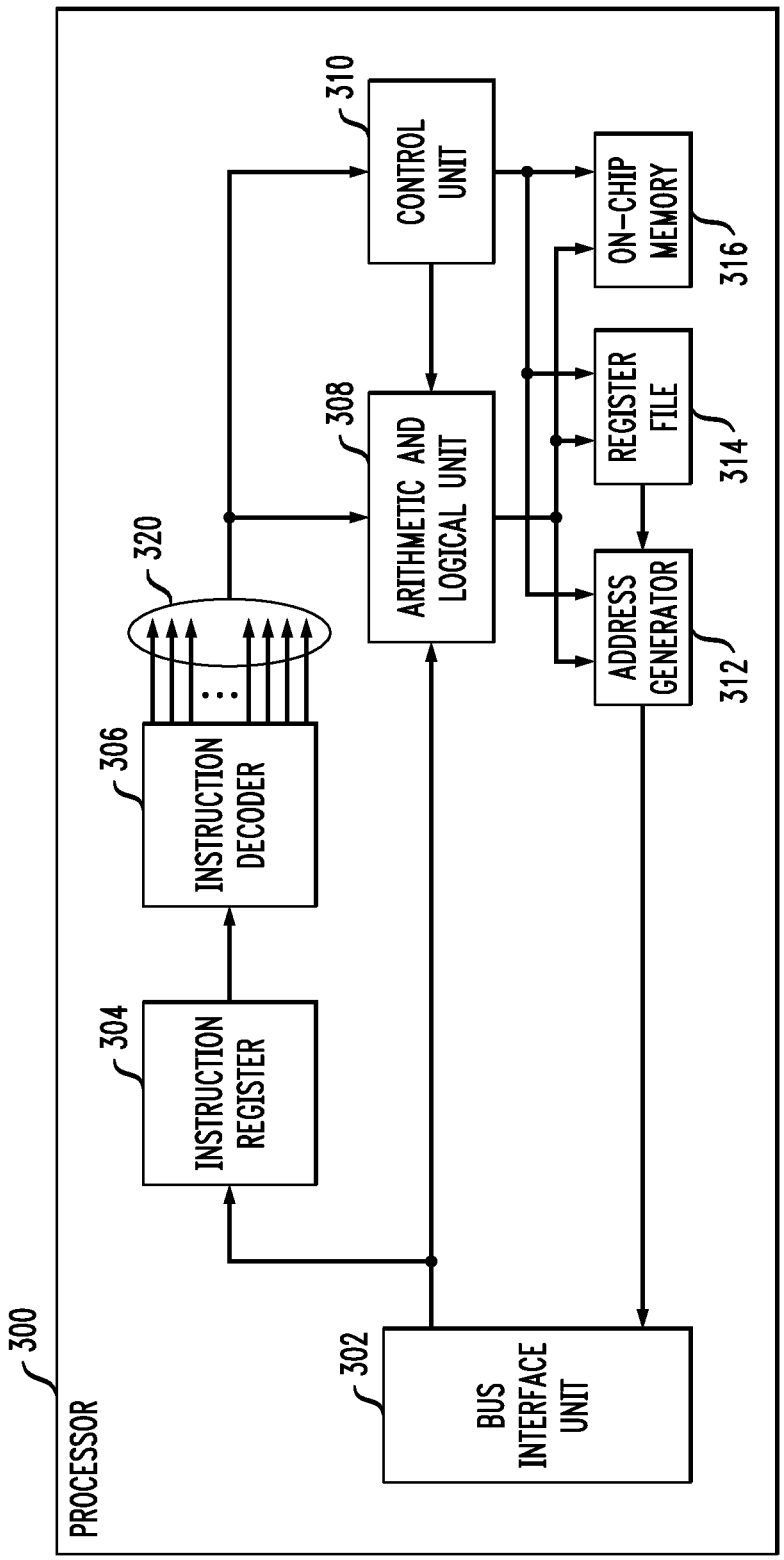
FIG. 3 is a block diagram of a processor configured for operation with multiple operation codes per instruction.

FIG. 3 shows an example of a processor 300 that may be implemented in accordance with the processor design 110 so as to operate with instructions that each may have multiple assigned opcodes. The processor 300 in this example is configured as a typical CPU, and may be coupled via a bus interface unit 302 to an external instruction memory and an external data memory. The latter two elements are omitted from the figure for simplicity and clarity of illustration.

The CPU may be viewed as an example of what is more generally referred to herein as "processing circuitry." This term is also intended to include, by way of example, a portion of a CPU or other digital data processor element, or combinations of multiple such digital data processor elements.

The term "memory circuitry" as used herein may refer to an instruction memory, a data memory, or both, as well as portions or combinations of these and other storage elements. Memory circuitry may be internal to the processing circuitry, external to the processing circuitry, or partially internal and partially external, as required to satisfy the needs of a given embodiment.

The processor 300 further includes an instruction register 304 coupled to an instruction decoder 306. As will be described in greater detail below in conjunction with FIG. 5, the instruction decoder 306 is configured to decode multiple operation codes per instruction to produce instructions 320. The produced instructions 320 may be in the form of, for example, any control and select signals, or other types of signals, that are required for execution of the instructions in processor 300. The term "instruction" as used herein is therefore intended to be construed broadly, so as to encompass, without limitation, any control and select signals, or other types of signals, associated with initiating or otherwise controlling one or more corresponding execution operations in the processor.

The instructions 320 are directed to an arithmetic and logical unit 308 and a control unit 310. Also included in the processor 300 is an address generator 312, a register file 314 and on-chip memory 316. Storage elements such as instruction register 304, register file 314 and on-chip memory 316 are considered to be examples of "memory circuitry" as that term is generally used herein. Other elements of the processor 300, such as instruction decoder 306, arithmetic and logical unit 308, and control unit 310, may be viewed as examples of "processing circuitry" as that term is generally used herein. Elements 302, 304, 308, 310, 312, 314 and 316 in the present embodiment may be configured to operate in a well-known conventional manner, and are therefore not described in further detail herein.

It should be noted that the particular interconnects among the elements shown in this figure are not intended to be limiting, and those skilled in the art will recognize that additional or alternative interconnects may be used. For example, a given directional connection may be part of a bidirectional connection, with only one direction shown in the figure for simplicity of illustration. In general, the directional connections shown may be replaced with bidirectional connections.

The processor 300 as shown in the figure may be viewed as comprising a single integrated circuit or multiple integrated circuits.

The processor 300 in the illustrative embodiment may be a pipelined processor in which execution of each instruction is divided into several stages. A pipelined processor generally includes a plurality of pipeline stages, such as a fetch stage, a decode stage, an execute stage and a writeback stage. The execute stage may comprise, for example, multiple specialized execution units, such as multipliers, adders or dividers, for performing integer or floating point arithmetic operations.

It is to be appreciated that the invention can be implemented using a wide variety of other types and configurations of processing circuitry and memory circuitry. For example, the processor 300 may include additional or alternative elements not explicitly shown, but of a type typically found in a conventional implementation of such a processor. Numerous such additional or alternative elements will be very familiar to those skilled in the art, and therefore will not be described herein.

Figure 4:
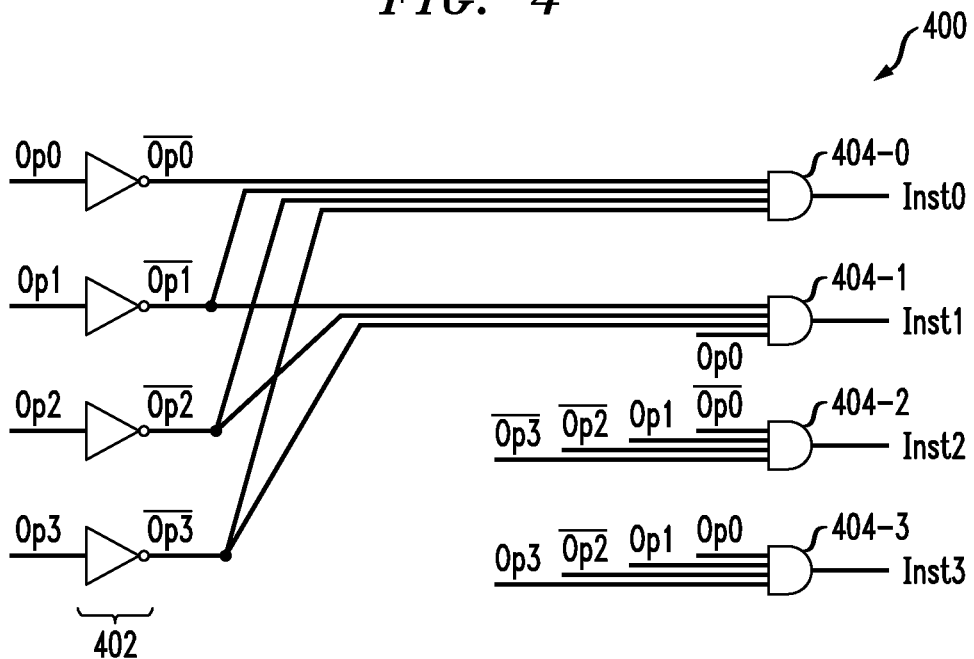
FIG. 4 is a schematic diagram showing an example of an instruction decoder in the case of assignment of a single operation code to each of a plurality of instructions.

FIG. 4 shows a simple example of one possible implementation of instruction decoder 306 for a conventional case in which only a single opcode is assigned to each instruction. In this simple example, there are four instructions, denoted Inst0, Inst1, Inst2 and Inst3, which have been assigned respective opcodes 0000, 0001, 0010 and 1011. Processing circuitry 400 of the instruction decoder comprises an inverter bank 402 having inputs that receive respective bits of an input opcode to be decoded. The bits of the input opcode are denoted Op0, Op1, Op2 and Op3. The processing circuitry 400 further comprises output logic gates 404-0, 404-1, 404-2 and 404-3 associated with the respective instructions Inst0, Inst1, Inst2 and Inst3. The logic gates 404 in this example are four-input AND gates, which receive inputs as shown in the figure. Depending on which of the four opcodes 0000, 0001, 0010 and 1011 is applied to the input of the inverter bank, a particular one of the logic gates 404 will have its output transition from a logic low level to a logic high level. For example, logic gate 404-0 receives as its four inputs the outputs Op0-bar, Op1-bar, Op2-bar and Op3-bar of the inverter bank 400. Thus, if the opcode 0000 is applied to the inverter bank input, the Inst0 output of AND gate 404-0 will transition from a logic low level to a logic high level, resulting of execution of the corresponding instruction in the processor 300.

As noted above, in the FIG. 4 arrangement, only a single opcode is assigned to a particular instruction. The illustrative embodiments of the present invention assign multiple opcodes to each of one or more instructions, as was previously described.

FIG. 5 shows processing circuitry 500 of the instruction decoder 306 in the case of assignment of multiple operation codes to each of a plurality of instructions. More specifically, in this simple example, the instructions Inst0, Inst1, Inst2 and Inst3 of the previous example are assigned the respective opcodes 0000, 0001, 0010 and 1011, while instructions Inst0, Inst1 and Inst2 are also assigned respective second opcodes 0100, 1001 and 0110. As in FIG. 4, only four instructions are shown in this particular example for simplicity of illustration, but other embodiments may of course involve an instruction set that includes many more than four instructions.

The processing circuitry 500 of the instruction decoder comprises an inverter bank 502 having inputs that receive respective bits of an input opcode to be decoded. The bits of the input opcode are again denoted Op1, Op1, Op2 and Op3. The processing circuitry 500 further comprises sets of logic circuitry 504-0, 504-1, 504-2 and 504-3 associated with the respective instructions Inst0, Inst1, Inst2 and Inst3. The sets of logic circuitry 504-0, 564-1 and 504-2 each comprise a pair of input NAND gates and an output NAND gate. Each of the input NAND gates in a given one of the sets corresponds to one of the two opcodes assigned to the instruction associated with that set. The final set of logic circuitry comprises only a single AND gate, since only a single opcode is assigned to the corresponding instruction.

Again, depending on which of the assigned opcodes is applied to the input of the inverter bank, a particular one of the output gates will have its output transition from a logic low level to a logic high level. For example, the output NAND gate of the set of logic circuitry 504-0 will transition from a logic low level to a logic high level if either of the two opcodes 0000 or 0100 assigned to instruction Inst0 is presented at the input of the inverter bank 502, resulting in execution of the corresponding instruction in the processor 300. Accordingly, regardless of which of the two assigned opcodes is selected for use by the code assembler 104, the resulting decoded instruction will be the same.

Of course, numerous other arrangements of logic gates or other logic circuitry may be utilized to implement a given embodiment of an instruction decoder of the type described above.

The illustrative embodiments of the invention as described above in conjunction with FIGS. 1, 2, 3 and 5 provide a number of significant advantages over conventional arrangements. For example, dynamic selection of the particular opcode used for a given instruction allows the dynamic power of the processor to be substantially reduced. Also, assignment of multiple opcodes per instruction provides an opportunity to optimize the decoder logic circuitry in a way that further reduces power consumption. For example, if both of the opcodes 1110 and 1111 are assigned for a given single instruction, the corresponding portion of the decoder may only include one 3-input AND gate rather than a 4-input AND gate with an inverter. In some embodiments, one may assign multiple opcodes to each of a number of instructions in order to both reduce dynamic power and optimize the design of the decoder logic circuitry. That is, both of these goals can be addressed in the assigning of multiple opcodes to each of a number of instructions.

The particular number of instructions for which multiple opcodes are assigned can vary depending on the needs of a given embodiment. For example, use may be made of the well-known 80-20 principle, which states that only 20% of the instructions in a given instruction set account for 80% of the run time instruction execution. Thus, one may identify this 20% of the instructions, or other suitable subset of the available instructions, as those for which multiple opcodes will be assigned. It should also be noted that a given instruction set may be divided into different classes of instructions and for certain classes there may be insufficient options to allow multiple opcode assignment. In such cases, one can provide degeneracy in opcode assignment for only those classes with sufficient assignment options.

As indicated above, a given embodiment of the present invention can be implemented as one or more integrated circuits. In such an arrangement, a plurality of identical die is typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiments disclosed herein assign two opcodes for each of a plurality of instructions, other embodiments can assign more than two opcodes to a given instruction. Also, the particular configuration of the processor and its instruction decoder or other associated elements can be varied in alternative embodiments. Other alternative embodiments of the invention may be configured utilizing different arrangements of memory circuitry and processing circuitry than those explicitly described above. These and numerous other alternative embodiments within the scope of the following claims will be apparent to those skilled in the art.

What is claimed is:

1. A processor comprising:

memory circuitry; and processing circuitry coupled to the memory circuitry and configured to retrieve operation codes from the memory circuitry and to decode said operation codes to produce corresponding instructions for execution by the processing circuitry;

wherein the processing circuitry is configured to decode a first operation code to produce a given one of the instructions and to decode a second operation code different than the first operation code to also produce the given one of the instructions, that same instruction thereby being produced for execution by the processing circuitry regardless of whether the first operation code or the second operation code is decoded;

wherein the first and second operation codes each correspond only to the given one of the instructions; and wherein the given one of the instructions corresponds to a set of one or more signals associated with one or more execution operations in the processor.

2. The processor of claim 1 wherein the processing circuitry comprises an instruction decoder.

3. The processor of claim 2 wherein the instruction decoder comprises at least a first input logic gate associated with the first operation code and a second input logic gate associated with the second operation code.

4. The processor of claim 3 wherein the instruction decoder comprises an input inverter bank having a plurality of inputs adapted to receive respective bits of an input operation code to be decoded.

5. The processor of claim 4 wherein the instruction decoder further comprises an output logic gate which generates an output at a given logic level if the input operation code is the first operation code or the second operation code.

6. The processor of claim 1 wherein the processor comprises a central processing unit.

7. The processor of claim 1 wherein the processor comprises a pipelined processor.

8. The processor of claim 1 wherein the processor is implemented in the form of an integrated circuit.

9. The processor of claim 1 wherein each of the instructions is within a specified instruction set.

10. A method for use in a processor, comprising the steps of:

retrieving operation codes from memory circuitry; and decoding said operation codes to produce corresponding instructions for execution;

wherein the step of decoding said operation codes comprises:

decoding a first operation code to produce a given one of the instructions; and decoding a second operation code different than the first operation code to also produce the given one of the instructions, that same instruction thereby being produced for execution regardless of whether the first operation code or the second operation code is decoded;

wherein the first and second operation codes each correspond only to the given one of the instructions; and wherein the given one of the instructions corresponds to a set of one or more signals associated with one or more execution operations in the processor.

11. The method of claim 10 wherein the step of decoding said operation codes further comprises the step of receiving respective bits of an input operation code to be decoded.

12. The method of claim 11 wherein the step of decoding said operation codes further comprises generating an output at a given logic level if the input operation code is the first operation code or the second operation code.

13. The method of claim 10 wherein each of the instructions is within a specified instruction set.

14. A processor comprising:

processing circuitry configured to retrieve operation codes from memory circuitry and to decode said operation codes to produce corresponding instructions for execution by the processing circuitry;

wherein the processing circuitry is configured to decode a first operation code to produce a given one of the instructions and to decode a second operation code different than the first operation code to also produce the given one of the instructions, that same instruction thereby being produced for execution by the processing circuitry regardless of whether the first operation code or the second operation code is decoded;

wherein the first and second operation codes each correspond only to the given one of the instructions; and wherein the given one of the instructions corresponds to a set of one or more signals associated with one or more execution operations in the processor.

15. The processor of claim 14 wherein the processing circuitry comprises at least a first input logic gate associated with the first operation code and a second input logic gate associated with the second operation code.

16. The processor of claim 15 wherein the processing circuitry comprises an input inverter bank having a plurality of inputs adapted to receive respective bits of an input operation code to be decoded.

17. The processor of claim 16 wherein the processing circuitry further comprises an output logic gate which generates an output at a given logic level if the input operation code is the first operation code or the second operation code.

18. The processor of claim 14 wherein the processor comprises a central processing unit.

19. The processor of claim 14 wherein the processor comprises a pipelined processor.

20. The processor of claim 14 wherein each of the instructions is within a specified instruction set.

* * * * *